(12) United States Patent
Lin et al.

(10) Patent No.: US 10,181,093 B2
(45) Date of Patent: Jan. 15, 2019

(54) SCANNING DEVICE

(71) Applicant: Foxlink Image Technology Co., Ltd., New Taipei (TW)

(72) Inventors: Yuan Yi Lin, New Taipei (TW); Hung Ming Chang, New Taipei (TW)

(73) Assignee: FOXLINK IMAGE TECHNOLOGY CO., LTD., New Taipei (TW)

(*) Notice: Subject to any disclaimer, the term of this patent is extended or adjusted under 35 U.S.C. 154(b) by 56 days.

(21) Appl. No.: 15/488,046

(22) Filed: Apr. 14, 2017

(65) Prior Publication Data
US 2018/0300593 A1 Oct. 18, 2018

(51) Int. Cl.
*G06K 13/08* (2006.01)
(52) U.S. Cl.
CPC .................. *G06K 13/085* (2013.01)
(58) Field of Classification Search
CPC .... G07F 7/0873; G06K 13/08; G06K 13/085; G06K 13/0873
See application file for complete search history.

(56) References Cited

U.S. PATENT DOCUMENTS

2005/0218227 A1* 10/2005 Takita .................. G06K 7/0069
235/441

FOREIGN PATENT DOCUMENTS

JP 2004157762 A * 6/2004

* cited by examiner

*Primary Examiner* — Laura Gudorf
(74) *Attorney, Agent, or Firm* — WPAT, PC

(57) ABSTRACT

A scanning device includes a base, an upper cover pivotally covered to the base, a motor mounted to the base, two roller assemblies, a sensor mounted in the first channel, and a card supporting mechanism. A first channel, a scanning channel and a second channel are formed between the upper cover and the base. The scanning channel has a scanning read line. The first channel, the scanning channel and the second channel are communicated with one another. The two roller assemblies are connected with and driven by the motor. The card supporting mechanism is mounted to the base. The card supporting mechanism includes a blocking board movably disposed behind the second channel along the longitudinal direction, and a front surface of the blocking board is parallel to the scanning read line and orthogonal to the second channel.

18 Claims, 16 Drawing Sheets

SCANNING DEVICE

BACKGROUND OF THE INVENTION

1. Field of the Invention

The present invention generally relates to a scanning device, and more particularly to a scanning device capable of preventing a card which is in the scanning device falling out thereof, and having a lower manufacturing cost and better scanning quality.

2. The Related Art

Referring to FIG. 13 to FIG. 16, a current scanning device 100' capable of scanning a card 200', includes a base 10', an upper cover (not shown), a first roller 20', a second roller 30' and a motor (not shown). The upper cover is covered on the base 10' to form a first channel 40', a scanning channel 50' and a second channel 60' between the upper cover and the base 10'. The scanning channel 50' is located behind the first channel 40'. The second channel 60' is located behind the scanning channel 50' and is communicated with an outside. The first roller 20' is mounted to the base 10' and projects into the first channel 40'. The second roller 30' is mounted to the base 10' and projects into the second channel 60'. The first roller 20' and the second roller 30' are connected with and are capable of being driven by the motor to rotate clockwise or anticlockwise. The first channel 40', the scanning channel 50' and the second channel 60' are communicated with one another.

The current scanning device 100' further includes a first sensor 70' disposed in the first channel 40', and a second sensor 80' disposed in the second channel 60' and located in front of a center line 31' of the second roller 30'. A scanning read line 51' is disposed in the scanning channel 50'. The first sensor 70' is used for detecting whether the card 200' is in the first channel 40'. The second sensor 80' is used for detecting an original position of the card 200'.

A working process of the current scanning device 100' is described as follows. The card 200' is inserted into the first channel 40'. After the first sensor 70' detects the card 200' is in the first channel 40', the first roller 20' and the second roller 30' rotate towards a forward direction to feed the card 200' backward, the card 200' passes through the scanning channel 50' until a rear of card 200' arrives to the second channel 60'. The rear of the card 200' is located between the center line 31' of the second roller 30' and the second sensor 80'. The rear of the card 200' keeps a distance from the scanning read line 51'. The first roller 20' and the second roller 30' stop rotating towards the forward direction and stop feeding the card 200' backward, at the moment, the card 200' is located at a stop position. After a preset time, the first roller 20' and the second roller 30' rotate towards a backward direction to feed the card 200' forward, when the card 200' touches the second sensor 80', the current scanning device 100' proceeds scanning the card 200', and the current scanning device 100' continues feeding the card 200' forward until a completion of scanning the card 200'. The backward direction is opposite to the forward direction. After the completion of scanning the card 200', the card 200' is fed out from the first channel 40'.

However, when the card 200' is fed backward, the card 200' is easily caused to be skewed that makes a part of the card 200' shield the scanning read line 51' before the card 200' is scanned, namely at the time of the card 200' being located at the stop position. In addition, the card 200' located at the stop position shields the scanning read line 51' on account of the second roller 30' slipping that makes the card 200' be partly without being scanned in the scanning process, so the card 200' is scanned incompletely. A manufacturing cost of the current scanning device 100' is higher on account of the current scanning device 100' needing to be equipped with the first sensor 70' and the second sensor 80'.

Moreover, the current scanning device 100' needs a smaller volume, so a distance between each two structures of the current scanning device 100' is smaller and smaller, correspondingly, a distance between the second sensor 80' and the center line 31' of the second roller 30' is smaller and smaller. Because control factors of the motor, tolerances of the mechanical dimensions, and so on, when the card 200' is fed backward, the rear of the card 200' projects beyond the center line 31' of the second roller 30' that causes the card 200' to fall out of the current scanning device 100' or causes the card 200' to have no way of being brought back to be scanned when the motor rotates towards the backward direction. The second channel 60' is communicated with the outside that easily causes dust or foreign matters to enter the second channel 60' to damage the current scanning device 100'.

Thus, in order to solve the above-mentioned problem, an innovative scanning device is essential to be provided. The innovative scanning device is capable of preventing a card which is in the innovative scanning device falling out thereof, and having a lower manufacturing cost and better scanning quality.

SUMMARY OF THE INVENTION

An object of the present invention is to provide a scanning device capable of scanning a card. One end of the card is defined as a feeding end, and the other end of the card is defined as a scanning end. The scanning device includes a base, an upper cover pivotally covered to the base, a motor mounted to the base, two roller assemblies, a sensor mounted in the first channel, and a card supporting mechanism. A bottom surface of the upper cover faces and is spaced from a top surface of the base. A first channel, a scanning channel and a second channel are formed between the bottom surface of the upper cover and the top surface of the base along a longitudinal direction. The scanning channel is located between the first channel and the second channel. The scanning channel has a scanning read line. The first channel, the scanning channel and the second channel are communicated with one another. The two roller assemblies are connected with and driven by the motor to be able to rotate towards a forward direction or a backward direction. One of the two roller assemblies is mounted to the base and projects into the first channel. The other roller assembly is mounted to the base and projects into the second channel. The card supporting mechanism is mounted to the base. The card supporting mechanism includes a blocking board movably disposed behind the second channel along the longitudinal direction, and a front surface of the blocking board is parallel to the scanning read line and orthogonal to the second channel. The card is capable of moving along the first channel, the scanning channel and the second channel. A rear surface of the feeding end of the card faces the front surface of the blocking board. Before the card is fed into the scanning channel to be scanned, the rear surface of the feeding end of the card abuts against the front surface of the blocking board for ensuring that a front surface of the scanning end of the card is parallel with and keeps a preset distance from the scanning read line.

As described above, the blocking board is disposed behind the second channel, and the front surface of the blocking board is parallel to the scanning read line and orthogonal to the second channel, before the card is fed into the scanning channel to be scanned, the rear surface of the feeding end of the card abuts against the front surface of the blocking board for ensuring that the front surface of the scanning end of the card is parallel with and keeps the preset distance from the scanning read line, the card will be without shielding the scanning read line, when the card is scanned, the card will be scanned completely, so the scanning device has better scanning quality. Moreover, because the blocking board of the card supporting mechanism blocks the card, the scanning device is capable of preventing the card which is in the scanning device falling out thereof, and correspondingly the card will never fall out of the scanning device when the card is fed in the backward direction, and a function of the scanning device is capable of being realized just by virtue of one sensor. As a result, the scanning device has a lower manufacturing cost and a smaller volume.

BRIEF DESCRIPTION OF THE DRAWINGS

The present invention will be apparent to those skilled in the art by reading the following description, with reference to the attached drawings, in which.

DETAILED DESCRIPTION OF THE PREFERRED EMBODIMENT

Figure 1:
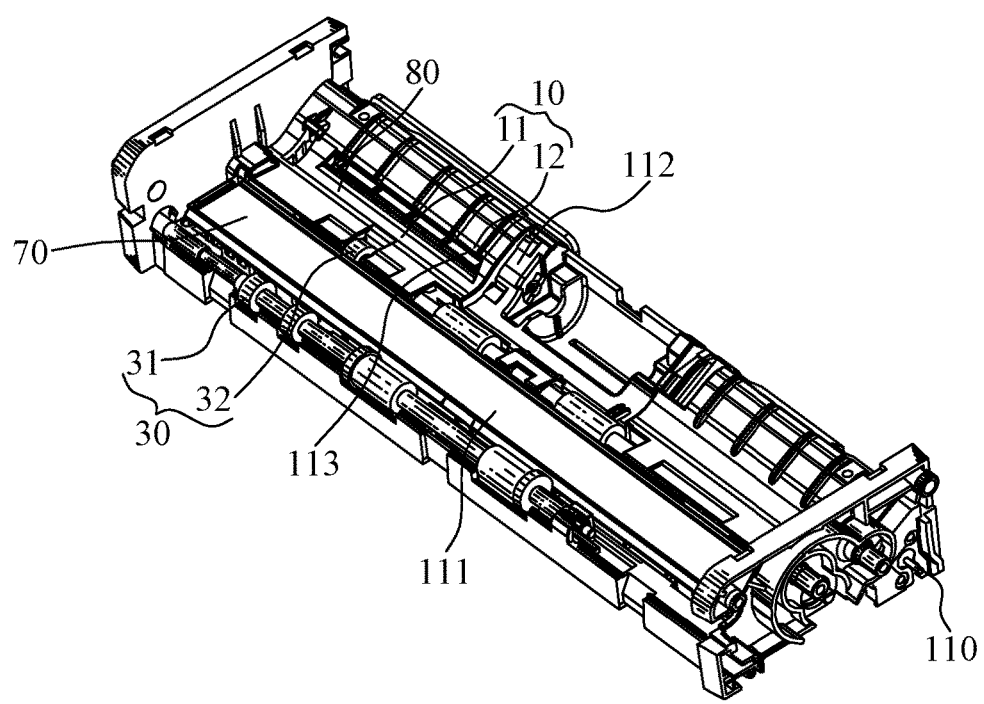
FIG. 1 is a perspective view of a scanning device in accordance with a first preferred embodiment of the present invention, wherein an upper cover is omitted.
Figure 2:
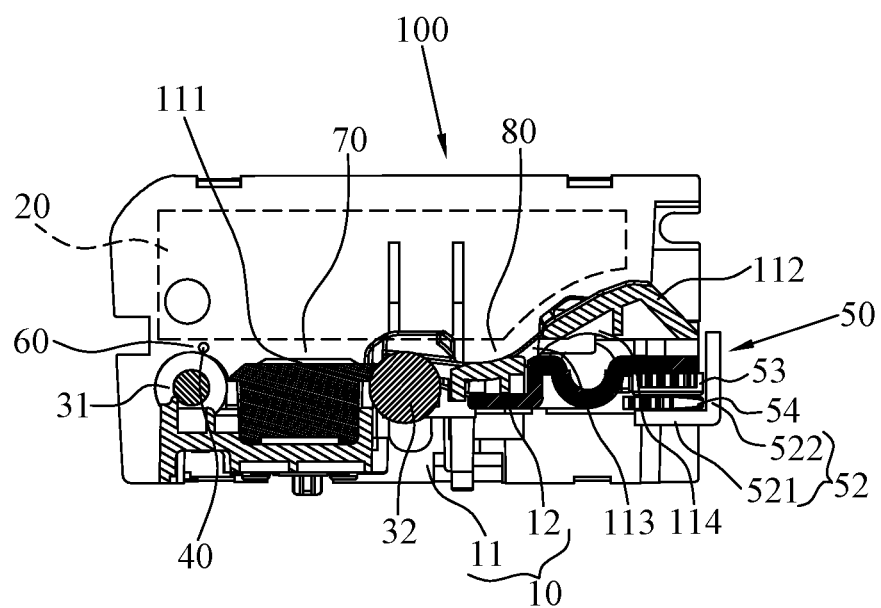
FIG. 2 is a cross-sectional schematic diagram of the scanning device of FIG. 1.
Figure 3:
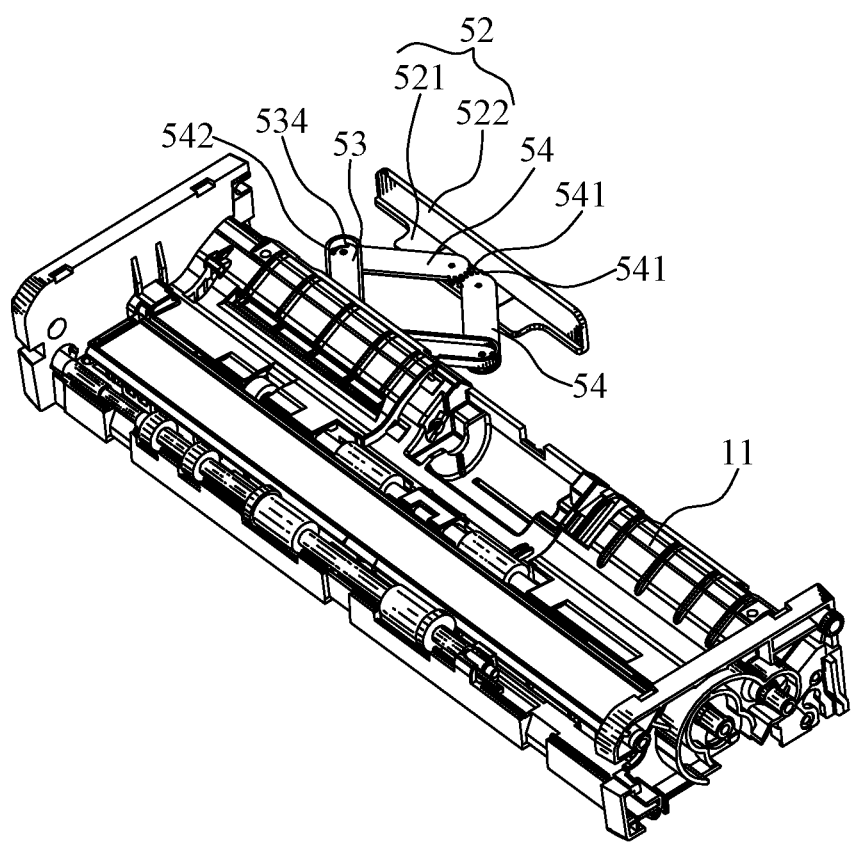
FIG. 3 is a perspective view of the scanning device of FIG. 1, wherein a first blocking arm moves in a backward direction.
Figure 4:
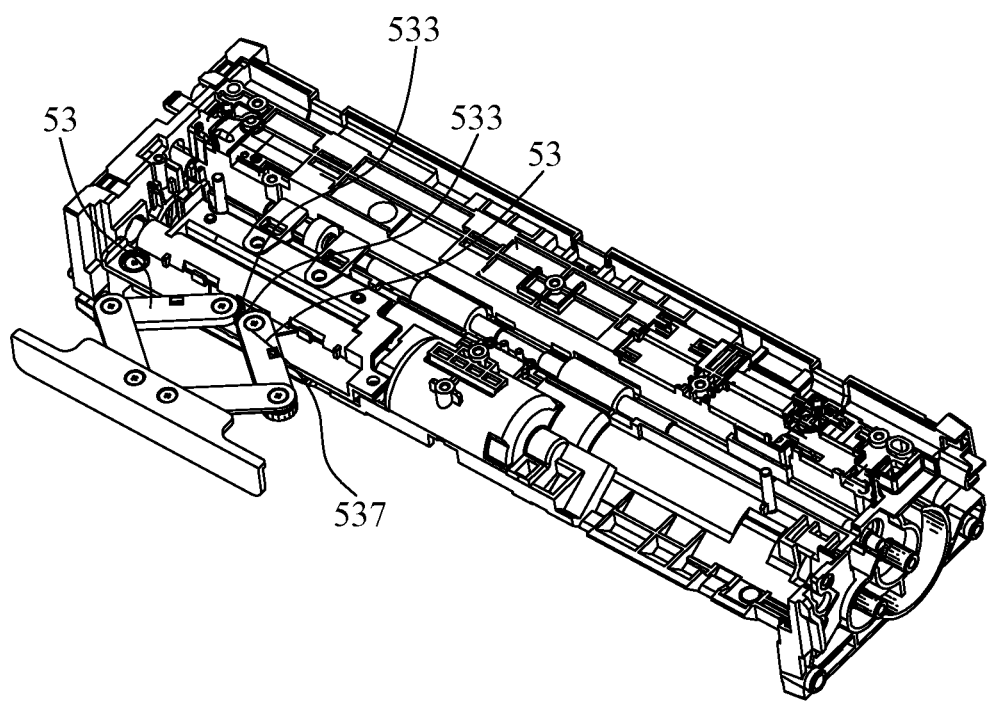
FIG. 4 is another perspective view of the scanning device of FIG. 3.
Figure 5:
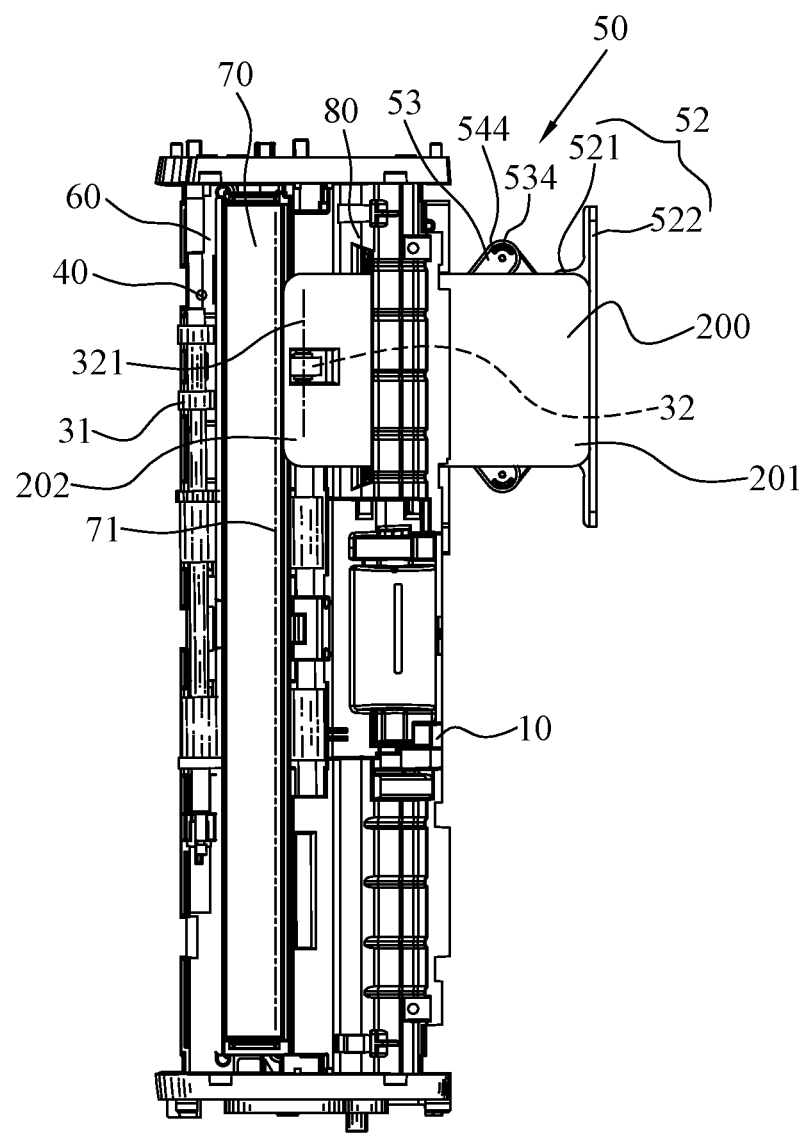
FIG. 5 is a schematic diagram of the scanning device of FIG. 1, wherein a rear surface of a feeding end of the card abuts against a front surface of a first blocking board of the first blocking arm.
Figure 6:
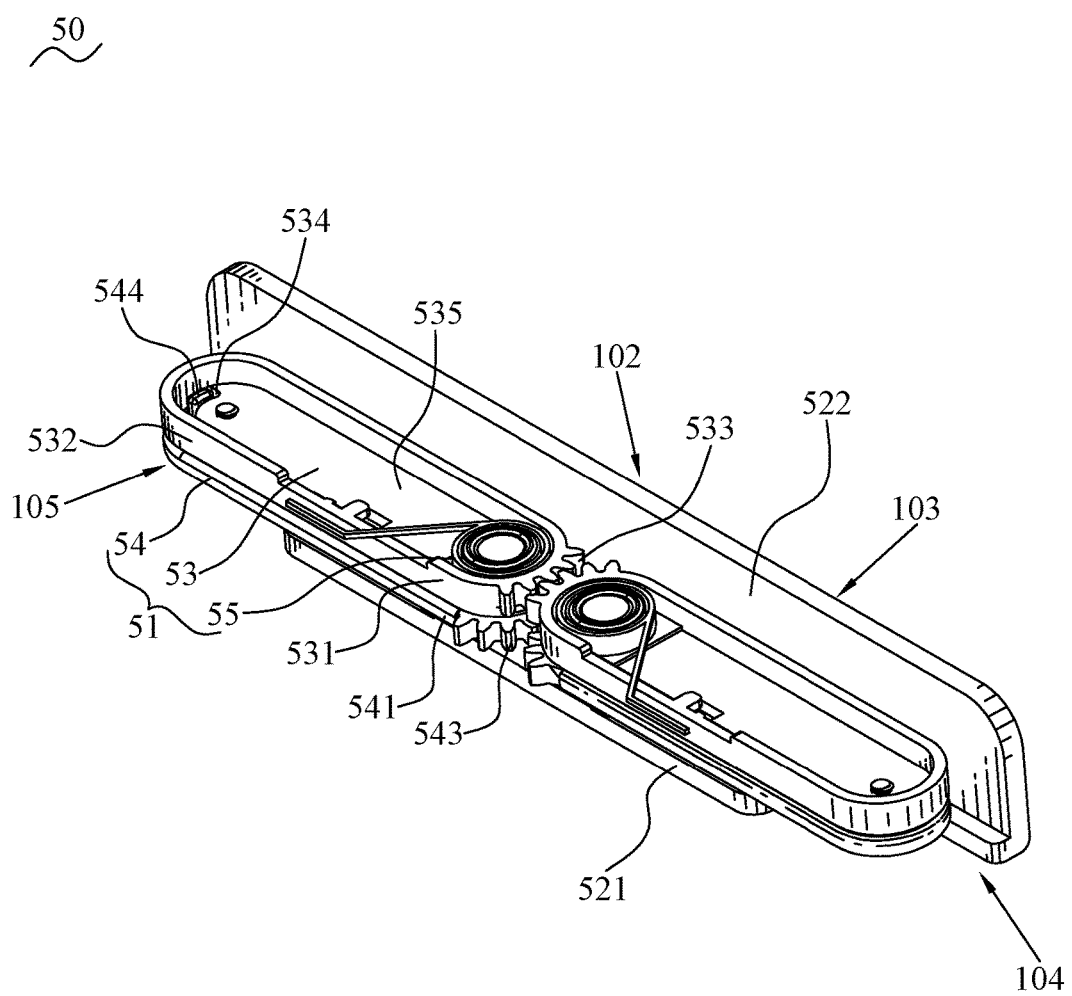
FIG. 6 is a perspective view of a first card supporting mechanism of the scanning device of FIG. 1, wherein two folding arms of the first card supporting mechanism are folded to form a substantially linear shape.
Figure 7:
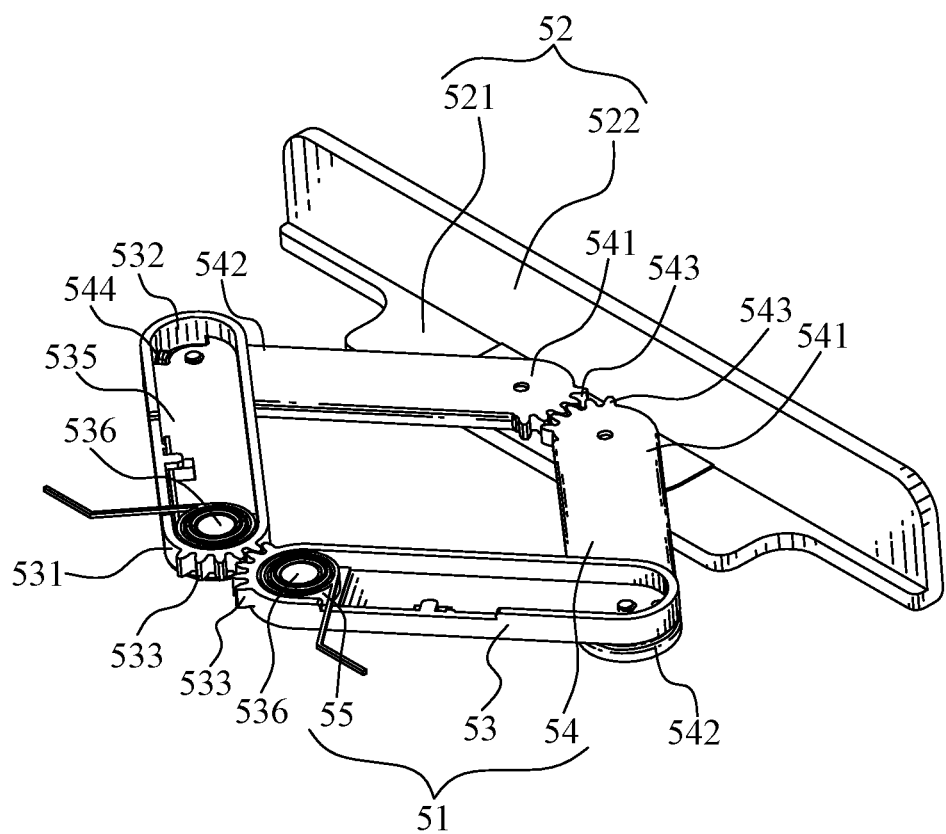
FIG. 7 is another perspective view of the first card supporting mechanism of the scanning device of FIG. 1, wherein the two folding arms are stretched out.

With reference to FIG. 1, FIG. 2 and FIG. 5, a scanning device 100 in accordance with a first preferred embodiment of the present invention is shown. The scanning device 100 is capable of scanning a card 200. The card 200 is one of an identification card, a bank card, a visiting card and so on. The scanning device 100 includes a base 10, an upper cover 20, a motor 110, two roller assemblies 30, a sensor 40 and a first card supporting mechanism 50. The upper cover 20 is pivotally covered to the base 10. A bottom surface of the upper cover 20 faces and is spaced from a top surface of the base 10. A first channel 60, a scanning channel 70 and a second channel 80 are formed between the bottom surface of the upper cover 20 and the top surface of the base 10 along a longitudinal direction. The scanning channel 70 is disposed behind the first channel 60. The second channel 80 is disposed behind the scanning channel 70. The scanning channel 70 is located between the first channel 60 and the second channel 80. The scanning channel 70 has a scanning read line 71. The first channel 60, the scanning channel 70 and the second channel 80 are communicated with one another.

Figure 8:
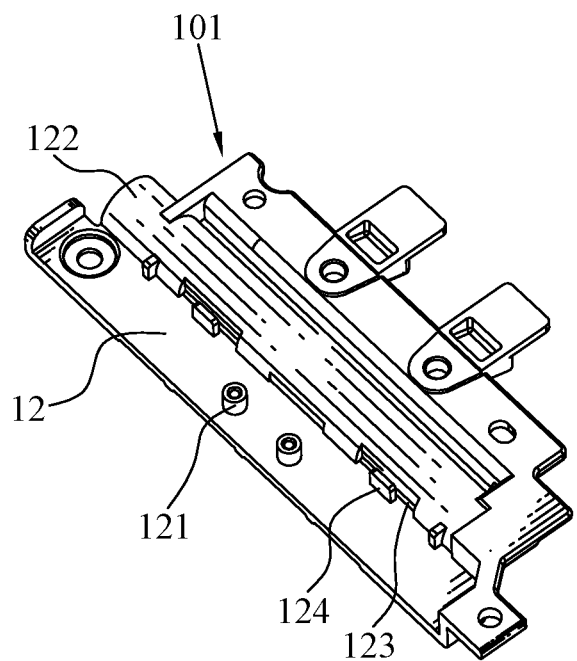
FIG. 8 is a perspective view of a first fastening portion of the scanning device of FIG. 1.
Figure 9:
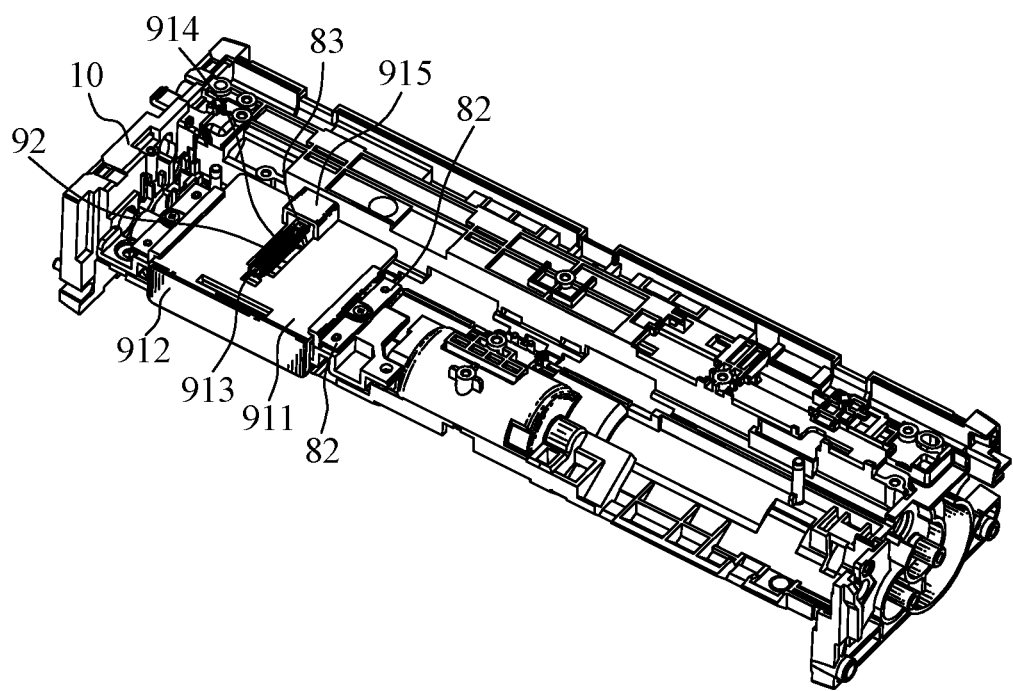
FIG. 9 is a perspective view of a scanning device in accordance with a second preferred embodiment of the present invention.
Figure 10:
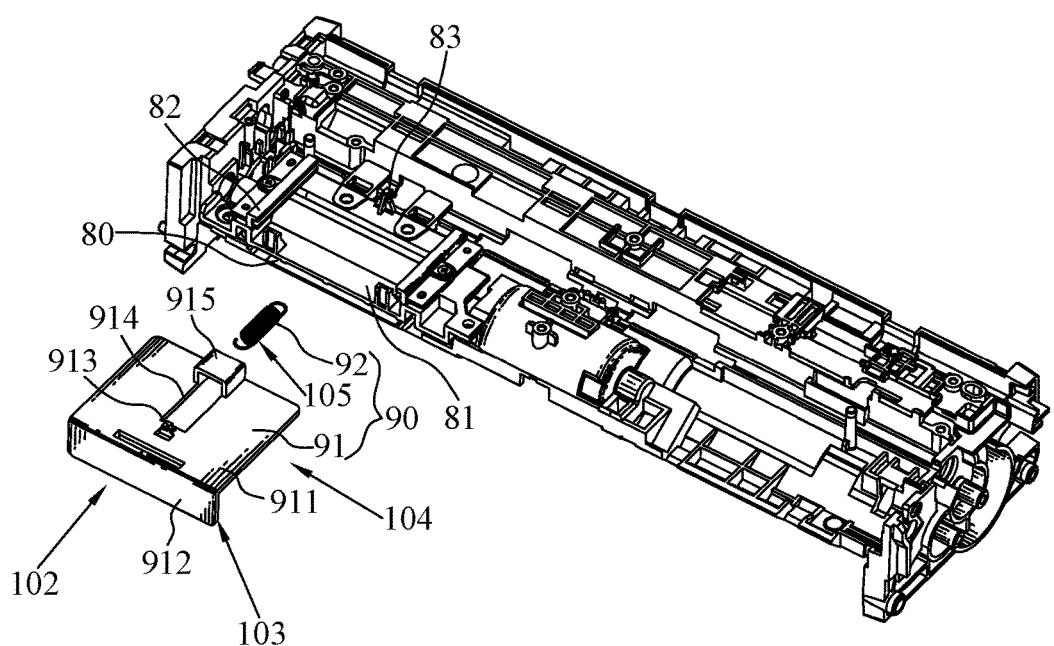
FIG. 10 is an exploded perspective view of the scanning device of FIG. 9.
Figure 11:
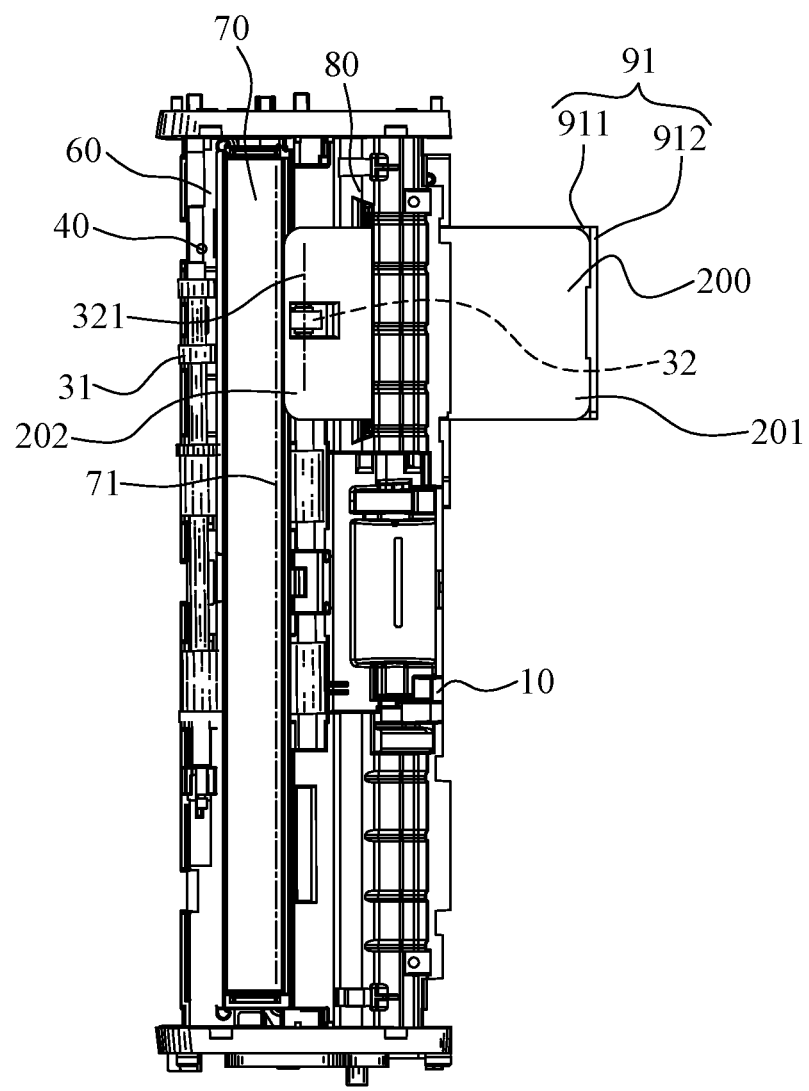
FIG. 11 is a schematic diagram of the scanning device of FIG. 9, wherein the rear surface of the feeding end of the card abuts against a front surface of a second blocking board of a second blocking arm.
Figure 12:
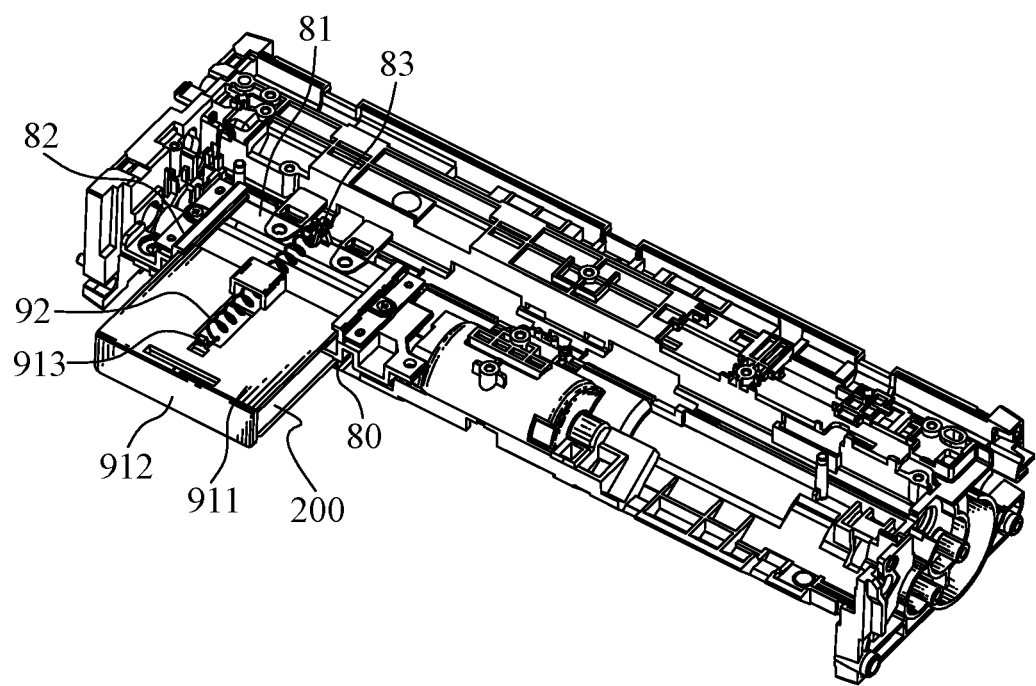
FIG. 12 is another perspective view of the scanning device of FIG. 11.
Figure 13:
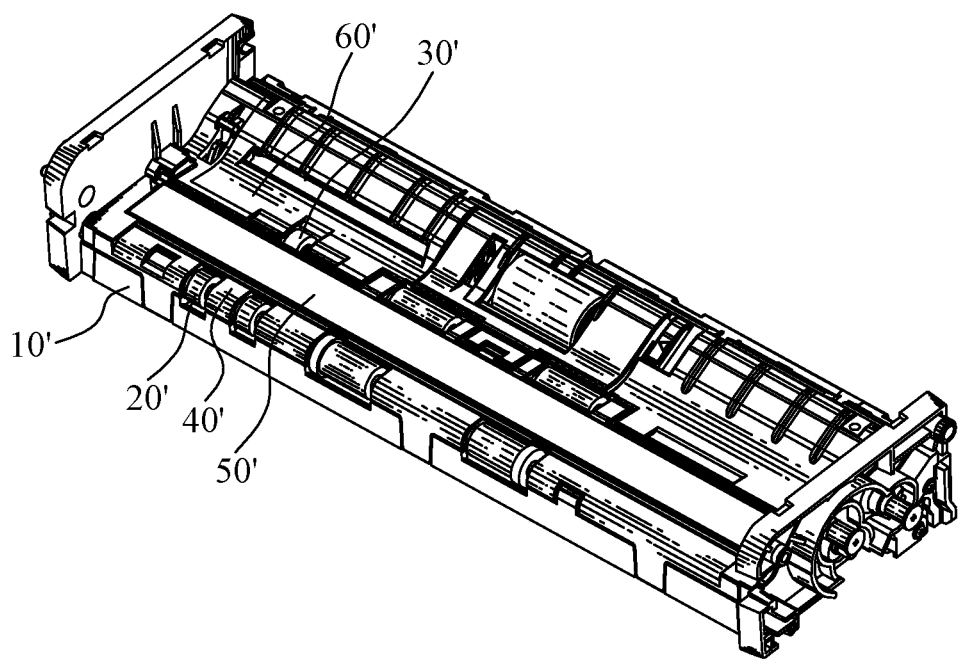
FIG. 13 is a perspective view of a scanning device in prior art, wherein an upper cover is omitted.
Figure 14:
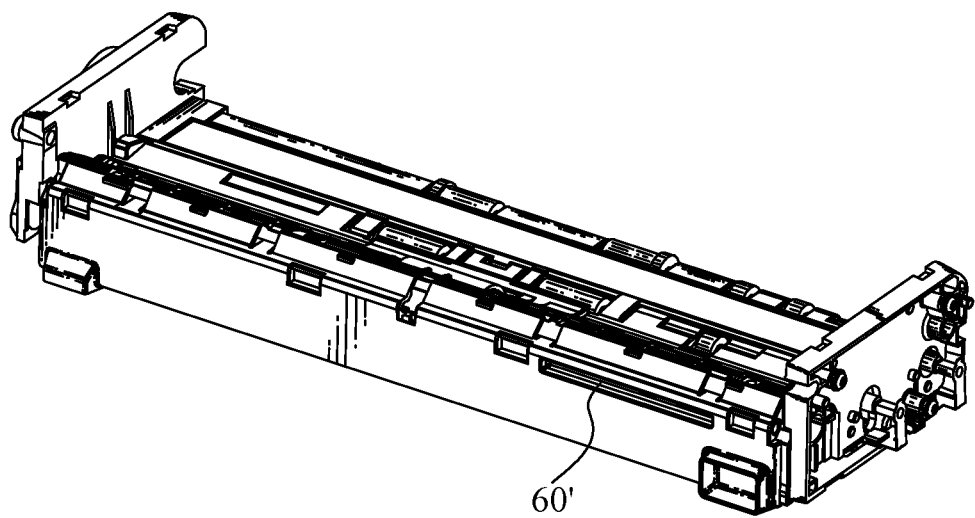
FIG. 14 is another perspective view of the scanning device of FIG. 13.
Figure 15:
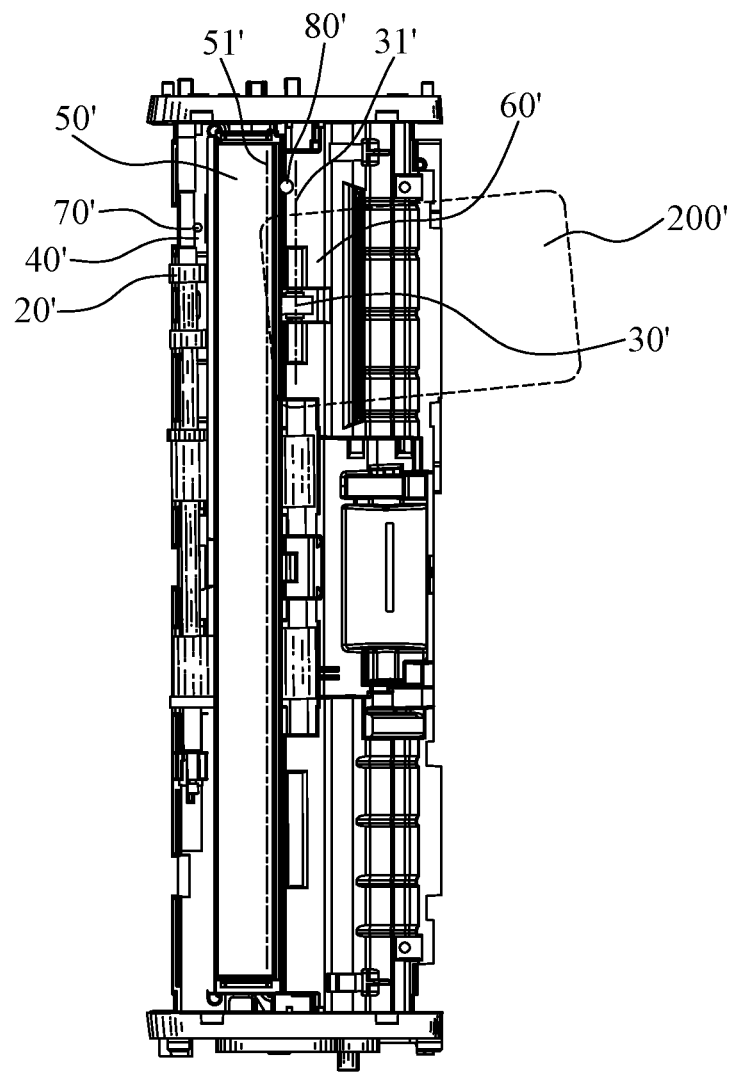
FIG. 15 is a schematic diagram of the scanning device in prior art scanning a card, wherein a part of the card shields a scanning read line when the card is skewed and located at a stop position.
Figure 16:
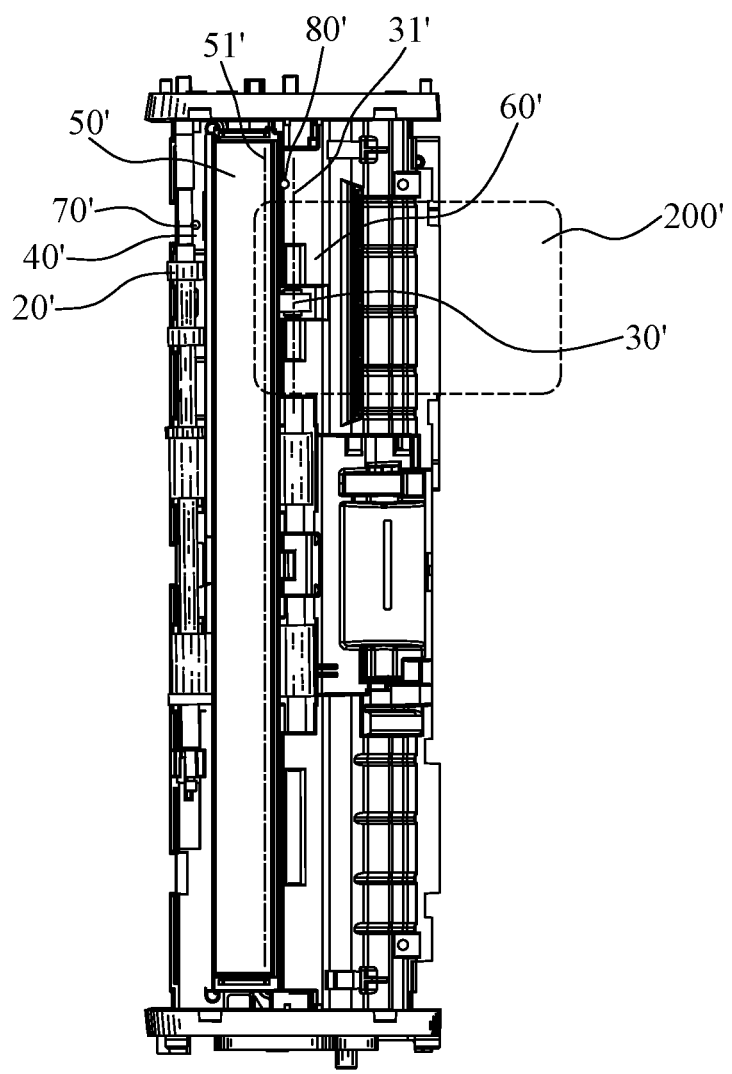
FIG. 16 is a schematic diagram of the scanning device in prior art scanning the card, wherein the part of the card shields the scanning read line on account of a second roller slipping when the card is located at the stop position.

Referring to FIG. 1, FIG. 2 and FIG. 8, the base 10 includes a main body 11, and a first fastening portion 12 mounted under the main body 11. A front of the main body 11 is defined as a transmitting platform 111. A rear of the main body 11 is defined as a returning protrusion 112 connected with and located behind the transmitting platform 111. A top of the returning protrusion 112 is arched in an upward direction to form an arc shape. The arc-shaped returning protrusion 112 projects beyond the transmitting platform 111. The first fastening portion 12 is located under the returning protrusion 112, and a top surface of the first fastening portion 12 is spaced from a bottom surface of the returning protrusion 112 to form a receiving space 114 between the top surface of the first fastening portion 12 and the bottom surface of the returning protrusion 112. A joint between the transmitting platform 111 and the returning protrusion 112 opens an opening 113 penetrating therethrough along the longitudinal direction. The opening 113 is communicated with the receiving space 114. The longitudinal direction is perpendicular to the upward direction.

After the upper cover 20 is pivotally covered to the base 10, the first channel 60 is formed between a front of the bottom surface of the upper cover 20 and a front of a top surface of the transmitting platform 111. The scanning channel 70 is formed between a middle of the bottom surface of the upper cover 20 and a middle of the top surface of the transmitting platform 111. A rear of the bottom surface of the upper cover 20 cooperates with a rear of the top surface of the transmitting platform 111, the opening 113 and the receiving space 114 of the base 10 to together form the second channel 80. Two portions of a rear of a bottom surface of the first fastening portion 12 protrude along a downward direction to form two protruding pillars 121 located under the second channel 80 and arranged along a transverse direction.

A substantial middle of the bottom surface of the first fastening portion 12 is arched in the downward direction to form an arching portion 122 located in front of the two protruding pillars 121. Two opposite sides of a rear surface of the arching portion 122 are recessed inward away from the two protruding pillars 121 to form two recesses 123. Two opposite sides of the rear of the bottom surface of the first fastening portion 12 protrude along the downward direction to form two blocking strips 124. The two blocking strips 124 are located behind and spaced from front walls of the two recesses 123, respectively. The downward direction is opposite to the upward direction. The transverse direction is orthogonal to the longitudinal direction. The transverse direction is perpendicular to the upward direction and the downward direction.

Referring to FIG. 1, FIG. 2 and FIG. 8, the motor 110 is mounted to the base 10. The two roller assemblies 30 are connected with and driven by the motor 110 to be able to rotate towards a forward direction or a backward direction. One of the two roller assemblies 30 is mounted to the base 10 and projects into the first channel 60. The other roller assembly 30 is mounted to the base 10 and projects into the second channel 80. Specifically, the two roller assemblies 30 include a first roller assembly 31 and a second roller assembly 32. The first roller assembly 31 is disposed to the main body 11 of the base 10 and projects into the first channel 60. The second roller assembly 32 is disposed to the main body 11 of the base 10 and projects into the second channel 80. The first roller assembly 31 and the second roller assembly 32 are connected with and driven by the motor 110 to be able to rotate towards the forward direction or the backward direction. The backward direction is opposite to the forward direction. The sensor 40 is mounted in the first channel 60.

Referring to FIG. 1 to FIG. 8, the first card supporting mechanism 50 mounted to the base 10, includes two folding arms 51 and a first blocking arm 52. The two folding arms 51 are pivotally mounted to the base 10 along the transverse direction and are flexibly located under the second channel 80. Specifically, front ends of the two folding arms 51 are pivotally mounted to the two protruding pillars 121. The first blocking arm 52 is capable of moving towards or away from the second channel 80 to be movably located to a rear end of the second channel 80 under an action of the two folding arms 51 which are folded or stretched out along the longitudinal direction. With respect to the second channel 80, the two folding arms 51 are capable of being folded to form a substantially linear shape or being stretched out along the longitudinal direction. The first blocking arm 52 has a first fastening board 521, and a first blocking board 522 perpendicularly protruded in the upward direction from a rear end of the first fastening board 521. Tail ends of the two folding arms 51 are pivotally mounted to the first fastening board 521 of the first blocking arm 52. The two folding arms 51 are located in front of the first blocking board 522. A front surface of the first blocking board 522 of the first blocking arm 52 is parallel to the scanning read line 71 and orthogonal to the second channel 80. The first blocking board 522 of the first blocking arm 52 is movably disposed behind the second channel 80 along the longitudinal direction.

The two folding arms 51 are engaged with each other. Each of the two folding arms 51 has a hollow first supporting arm 53, a second supporting arm 54 and a torsion spring 55. A shape of the first supporting arm 53 is similarly the same as a shape of the second supporting arm 54. The first supporting arm 53 has a first connecting end 531, and a first pivoting end 532 opposite to the first connecting end 531. The second supporting arm 54 has a second connecting end 541, and a second pivoting end 542 opposite to the second connecting end 541. The two torsion springs 55 of the two folding arms 51 are pivotally mounted to the first connecting ends 531 of the first supporting arms 53 of the two folding arms 51, respectively. The first connecting ends 531 of the first supporting arms 53 of the two folding arms 51 together with the two torsion springs 55 are pivotally mounted to the first fastening portion 12 of the base 10 and are located under the second channel 80. The first pivoting ends 532 of the first supporting arms 53 of the two folding arms 51 are pivotally mounted to the second pivoting ends 542 of the second supporting arms 54 of the two folding arms 51, respectively. The second connecting ends 541 of the second supporting arms 54 of the two folding arms 51 are pivotally mounted to the first fastening board 521 of the first blocking arm 52.

The first connecting ends 531 of the first supporting arms 53 of the two folding arms 51 are engaged with each other. Several portions of two facing surfaces of the two first connecting ends 531 of the two first supporting arms 53 of the two folding arms 51 protrude opposite to the two first pivoting ends 532 of the two first supporting arms 53 of the two folding arms 51 to form a plurality of first teeth 533. The first teeth 533 of the first supporting arm 53 of one of the two folding arms 51 are engaged with the first teeth 533 of the first supporting arm 53 of the other folding arm 51. The second connecting ends 541 of the second supporting arms 54 of the two folding arms 51 are engaged with each other. Several portions of two facing surfaces of the two second connecting ends 541 of the two second supporting arms 54 of the two folding arms 51 protrude opposite to the two second pivoting ends 542 of the two second supporting arms 54 of the two folding arms 51 to form a plurality of second teeth 543. The second teeth 543 of the second supporting arm 54 of one of the two folding arms 51 are engaged with the second teeth 543 of the second supporting arm 54 of the other folding arm 51.

A middle of a top surface of the first supporting arm 53 is recessed in the downward direction to form a locating groove 535. A bottom wall of the locating groove 535 protrudes in the upward direction to form a ring-shaped pivoting ring 536 located at the first connecting end 531. A portion of a bottom surface of the bottom wall of the locating groove 535 located under the pivoting ring 536 is recessed towards the pivoting ring 536 to form a pivoting hole 537 communicated with a middle of the pivoting ring 536. The two torsion springs 55 of the two folding arms 51 are pivotally mounted in the two locating grooves 535 of the first supporting arms 53 of the two folding arms 51, respectively. The torsion spring 55 is pivotally worn around the pivoting ring 536. The first pivoting end 532 defines an arc-shaped limiting groove 534 penetrating through the first pivoting end 532 along the downward direction.

A top surface of the second pivoting end 542 protrudes in the upward direction to form a limiting block 544. The limiting block 544 is limited in the limiting groove 534 for limiting a rotating angle of the second supporting arm 54 with respect to the first supporting arm 53. One end of the torsion spring 55 is pivotally mounted to the first supporting arm 53, and the other end of the torsion spring 55 is mounted to the first fastening portion 12 of the base 10. The two protruding pillars 121 are pivotally mounted in the two pivoting rings 536 of the two first supporting arms 53 of the two folding arms 51, respectively. Free ends of the protruding pillars 121 are exposed to the pivoting holes 537 of the first supporting arms 53 of the two folding arms 51, respectively. The other ends of the two torsion springs 55 of the two folding arms 51 are blocked by the two blocking strips 124, respectively. The other ends of the torsion springs 55 of the two folding arms 51 project into the two recesses 123, respectively.

One end of the card 200 is defined as a feeding end 201, and the other end of the card 200 is defined as a scanning end 202.

Referring to FIG. 1 to FIG. 8, when the scanning device 100 is in an unused status, namely when the two folding arms 51 are folded, the first supporting arm 53 and the second supporting arm 54 of one of the two folding arms 51 are folded together and are substantially aligned with each other, and the first supporting arm 53 and the second supporting arm 54 of the other folding arm 51 are folded together and are substantially aligned with each other, so the two second supporting arms 54 of the two folding arms 51 are corresponding to and are substantially aligned with the two first supporting arms 53 of the two folding arms 51 to show the substantially linear shape. The two second supporting arms 54 and the two first arms 53 are received between the first blocking arm 52 and the first fastening portion 12. The first teeth 533 of the first supporting arm 53 of one of the two folding arms 51 are engaged with the first teeth 533 of the first supporting arm 53 of the other folding arm 51. The second teeth 543 of the second supporting arm 54 of one of the two folding arms 51 are engaged with the second teeth 543 of the second supporting arm 54 of the other folding arm 51. When the two folding arms 51 of the first card supporting mechanism 50 are folded to form the substantially linear shape along the longitudinal direction, the first blocking board 522 of the first blocking arm 52 is located to the rear end of the second channel 80 and blocks the second channel 80 for preventing dust or foreign materials entering the second channel 80 so as to prevent damaging the scanning device 100.

When the scanning device 100 is in work, the card 200 is capable of moving along the first channel 60, the scanning channel 70 and the second channel 80. In detail, firstly, the card 200 is inserted into the first channel 60 and triggers the sensor 40. After the sensor 40 is triggered, the motor 110 drives the first roller assembly 31 and a second roller assembly 32 to rotate towards the forward direction. The first roller assembly 31 drives the card 200 to be fed in the backward direction, the card 200 passes through the scanning channel 70 to the second roller assembly 32 in the second channel 80. When the card 200 passes through the scanning channel 70, the scanning device 100 is without scanning the card 200. A rear surface of the feeding end 201 of the card 200 faces the front surface of the first blocking board 522. The second roller assembly 32 drives the card 200 to continue being fed in the backward direction until the rear surface of the feeding end 201 of the card 200 abuts against the front surface of the first blocking board 522. The card 200 pushes against the first blocking board 522 of the first blocking arm 52 to move in the backward direction to drive the first supporting arm 53 and the second supporting arm 54 of each of the two folding arms 51 to be stretched out and move along a preset route. The first supporting arm 53 drives the torsion spring 55 to be stretched.

After the first supporting arm 53 and the second supporting arm 54 of each of the two folding arms 51 complete moving along the preset route, the motor 110 continues rotating towards the forward direction for a preset time to make the rear surface of the feeding end 201 of the card 200 abuts against the front surface of the first blocking board 522 of the first blocking arm 52 for ensuring that a front surface of the scanning end 202 of the card 200 is parallel with and keeps a preset distance from the scanning read line 71, the card 200 will be without shielding the scanning read line 71, when the card 200 is scanned, the card 200 will be scanned completely.

After the motor 110 rotates towards the forward direction for the preset time, the motor 110 stops rotating towards the forward direction, the torsion spring 55 returns and drives the first blocking board 522 to move in the forward direction, at the moment, the scanning device 100 triggers a scanning mode, the motor 110 rotates towards the backward direction to drive the first roller assembly 31 and the second roller assembly 32 to rotate towards the backward direction, the second roller assembly 32 drives the card 200 to be fed in the forward direction into the scanning channel 70 and the card 200 is started being scanned, the second roller assembly 32 continues driving the card 200 to be fed in the forward direction to the first channel 60, and then the first roller assembly 31 drives the card 200 to be fed out in the forward direction until the card 200 is completely scanned.

An assembling stability between the two first supporting arms 53 is assured by virtue of the first teeth 533 of the first supporting arm 53 of one of the two folding arms 51 being engaged with the first teeth 533 of the first supporting arm 53 of the other folding arm 51. An assembling stability between the two second supporting arms 54 is assured by virtue of the second teeth 543 of the second supporting arm 54 of one of the two folding arms 51 being engaged with the second teeth 543 of the second supporting arm 54 of the other folding arm 51. The first blocking board 522 of the first blocking arm 52 will be without being skewed.

The torsion spring 55 of the scanning device 100 returns and drives the first blocking board 522 to move in the forward direction, so that when the card 200 is fed in the backward direction, though the scanning end 202 of the scanning card 200 projects beyond a center line 321 of the second roller assembly 32, the card 200 is still capable of being returned to the center line 321 of the second roller assembly 32. Because the first blocking board 522 of the first blocking arm 52 blocks the card 200, the scanning device 100 is capable of preventing the card 200 which is in the scanning device 100 falling out thereof, and correspondingly the card 200 will never fall out of the scanning device 100 when the card 200 is fed in the backward.

Referring to FIG. 1 to FIG. 12, a scanning device 100 in accordance with a second preferred embodiment is shown. Comparing with the first embodiment, differences between the first preferred embodiment and the second preferred embodiment are described as follows. The first fastening portion 12 in accordance with the first preferred embodiment is replaced by a second fastening portion 81 in accordance with the second preferred embodiment, and the first card supporting mechanism 50 in accordance with the first preferred embodiment is replaced by a second card supporting mechanism 90 in accordance with the second preferred embodiment.

The base 10 includes the second fastening portion 81. Two opposite sides of a bottom surface of the second fastening portion 81 are equipped with two guiding rails 82, respectively. A rear of the bottom surface of the second fastening portion 81 protrudes in the downward direction to form a first buckling portion 83 located between the two guiding rails 82. The second card supporting mechanism 90 mounted to the base 10, includes a second blocking arm 91 and a spring 92. The second blocking arm 91 has a second fastening board 911, and a second blocking board 912 perpendicularly protruded in the upward direction from a rear end of the second fastening board 911. A front surface of the second blocking board 912 of the second blocking arm 91 is parallel to the scanning read line 71 and orthogonal to the second channel 80. The second blocking board 912 is movably disposed behind the second channel 80 along the longitudinal direction. The second blocking board 912 of the second blocking arm 91 is capable of moving in the backward direction along the two guiding rails 82.

A middle of a front of a bottom surface of the second fastening board 911 protrudes in the downward direction to form a second buckling portion 913. The second fastening board 911 opens a holding groove 914 penetrating through middles of a top surface, the bottom surface and a rear surface of the second fastening board 911. The holding groove 914 is located behind the second buckling portion 913. A substantially U-shaped reinforcing portion 915 is connected with the bottom surface of the second fastening board 911. The mouth of the reinforcing portion 915 faces the holding groove 914. Top surfaces of two opposite sides of the reinforcing portion 915 are connected with bottom surfaces of two opposite side walls of the holding groove 914. The spring 92 is elastically received in the holding groove 914. One end of the spring 92 is fastened to the first buckling portion 83. The other end of the spring 92 is fastened to the second buckling portion 913. So the spring 92 is elastically fastened between the second blocking arm 91 and the second fastening portion 81 of the base 10. The second blocking arm 91 is capable of moving towards or away from the second channel 80 to be movably located to the rear end of the second channel 80 under an action of the spring 92 which is compressed or stretched.

Referring to FIG. 1 to FIG. 12 again, when the scanning device 100 in accordance with the second preferred embodiment is in an unused status, namely when the spring 92 is compressed, the second blocking board 912 of the second blocking arm 91 is located to the rear end of the second channel 80 and blocks the second channel 80.

When the scanning device 100 in accordance with the second preferred embodiment is in work, the card 200 is capable of moving along the first channel 60, the scanning channel 70 and the second channel 80. In detail, firstly, the card 200 is inserted into the first channel 60 and triggers the sensor 40. After the sensor 40 is triggered, the motor 110 drives the first roller assembly 31 and a second roller assembly 32 to rotate towards the forward direction. The first roller assembly 31 drives the card 200 to be fed in the backward direction, the card 200 passes through the scanning channel 70 to the second roller assembly 32 in the second channel 80. When the card 200 passes through the scanning channel 70, the scanning device 100 is without scanning the card 200. The rear surface of the feeding end 201 of the card 200 faces the front surface of the second blocking board 912. The second roller assembly 32 drives the card 200 to continue being fed in the backward direction until the rear surface of the feeding end 201 of the card 200 abuts against the front surface of the second blocking board 912 of the second blocking arm 91. The card 200 pushes against the second blocking board 912 of the second blocking arm 91 to move in the backward direction along the two guiding rails 82. The second blocking arm 91 drives the spring 92 to be stretched.

After the second blocking arm 91 moves along a preset route, the motor 110 continues rotating towards the forward direction for the preset time to make the rear surface of the feeding end 201 of the card 200 abuts against the front surface of the second blocking board 912 for ensuring that the front surface of the scanning end 202 of the card 200 is parallel with and keeps the preset distance from the scanning read line 71. The card 200 will be without shielding the scanning read line 71. When the card 200 is scanned, the card 200 will be scanned completely.

After the motor 110 rotates towards the forward direction for the preset time, the motor 110 stops rotating towards the forward direction, the spring 92 returns and drives the second blocking board 912 to move in the forward direction, at the moment, the scanning device 100 triggers the scanning mode, the motor 110 rotates towards the backward direction to drive the first roller assembly 31 and the second roller assembly 32 to rotate towards the backward direction, the second roller assembly 32 drives the card 200 to be fed in the forward direction into the scanning channel 70 and the card 200 is started being scanned. The second roller assembly 32 continues driving the card 200 to be fed in the forward direction to the first channel 60, and then the first roller assembly 31 drives the card 200 to be fed out in the forward direction until the card 200 is completely scanned. Because the second blocking board 912 of the second blocking arm 91 blocks the card 200, the scanning device 100 is capable of preventing the card 200 which is in the scanning device 100 falling out thereof, and correspondingly the card 200 will never fall out of the scanning device 100 when the card 200 is fed in the backward direction.

The scanning device 100 in accordance with the present invention includes a fastening portion 101, and a card supporting mechanism 102 mounted to the base 10. The fastening portion 101 is the first fastening portion 12 or the second fastening portion 81. The card supporting mechanism 102 is the first card supporting mechanism 50 or the second card supporting mechanism 90. The card supporting mechanism 102 includes a blocking arm 104 which has a blocking board 103, and an elastic element 105. The blocking arm 104 is the first blocking arm 52 or the second blocking arm 91. The blocking board 103 is the first blocking board 522 or the second blocking board 912. The elastic element 105 is the folding arm 51 or the spring 92. The blocking board 103 is movably disposed behind the second channel 80 along the longitudinal direction. A front surface of the blocking board 103 is parallel to the scanning read line 71 and orthogonal to the second channel 80. The rear surface of the feeding end 201 of the card 200 faces the front surface of the blocking board 103. Before the card 200 is fed into the scanning channel 70 to be scanned, the rear surface of the feeding end 201 of the card 200 abuts against the front surface of the blocking board 103 for ensuring that the front surface of the scanning end 202 of the card 200 is parallel with and keeps the preset distance from the scanning read line 71. The blocking arm 104 is capable of moving towards or away from the second channel 80 to be movably located to the rear end of the second channel 80 under an action of the elastic element 105. Because the blocking board 103 of the card supporting mechanism 102 blocks the card 200, the scanning device 100 is capable of preventing the card 200 which is in the scanning device 100 falling out thereof, and correspondingly the card 200 will never fall out of the scanning device 100 when the card 200 is fed in the backward direction.

As described above, the blocking board 103 is disposed behind the second channel 80, and the front surface of the blocking board 103 is parallel to the scanning read line 71 and orthogonal to the second channel 80, before the card 200 is fed into the scanning channel 70 to be scanned, the rear surface of the feeding end 201 of the card 200 abuts against the front surface of the blocking board 103 for ensuring that the front surface of the scanning end 202 of the card 200 is parallel with and keeps the preset distance from the scanning read line 71, the card 200 will be without shielding the scanning read line 71, when the card 200 is scanned, the card 200 will be scanned completely, so the scanning device 100 has better scanning quality. Moreover, because the blocking board 103 of the card supporting mechanism 102 blocks the card 200, the scanning device 100 is capable of preventing the card 200 which is in the scanning device 100 falling out thereof, and correspondingly the card 200 will never fall out of the scanning device 100 when the card 200 is fed in the backward direction, and a function of the scanning device 100 is capable of being realized just by virtue of one sensor 40. As a result, the scanning device 100 has a lower manufacturing cost and a smaller volume.

What is claimed is:

1. A scanning device capable of scanning a card, one end of the card being defined as a feeding end, and the other end of the card being defined as a scanning end, the scanning device comprising:

a base;

an upper cover pivotally covered to the base, a bottom surface of the upper cover facing and being spaced from a top surface of the base, a first channel, a scanning channel and a second channel being formed between the bottom surface of the upper cover and the top surface of the base along a longitudinal direction, the scanning channel being located between the first channel and the second channel, the scanning channel having a scanning read line, the first channel, the scanning channel and the second channel being communicated with one another;

a motor mounted to the base;

two roller assemblies connected with and driven by the motor to be able to rotate towards a forward direction or a backward direction, one of the two roller assemblies being mounted to the base and projecting into the first channel, the other roller assembly being mounted to the base and projecting into the second channel;

a sensor mounted in the first channel; and a card supporting mechanism mounted to the base, the card supporting mechanism including a blocking board movably disposed behind the second channel along the longitudinal direction, and a front surface of the blocking board being parallel to the scanning read line and orthogonal to the second channel, wherein the card supporting mechanism is a first card supporting mechanism which includes two folding arms and a first blocking arm, tail ends of the two folding arms are pivotally mounted to the first blocking arm, the two folding arms are pivotally mounted to the base along a transverse direction and flexibly located under the second channel, the transverse direction is orthogonal to the longitudinal direction, the first blocking arm is capable of moving towards or away from the second channel to be movably located to a rear end of the second channel under an action of the two folding arms which are folded or stretched out along the longitudinal direction, with respect to the second channel, the two folding arms are capable of being folded to form a substantially linear shape or being stretched out along the longitudinal direction, when the two folding arms are folded to form the substantially linear shape along the longitudinal direction, the first blocking arm is located to the rear end of the second channel and blocks the second channel;

wherein the card is capable of moving along the first channel, the scanning channel and the second channel, a rear surface of the feeding end of the card faces the front surface of the blocking board, before the card is fed into the scanning channel to be scanned, the rear surface of the feeding end of the card abuts against the front surface of the blocking board for ensuring that a front surface of the scanning end of the card is parallel with and keeps a preset distance from the scanning read line.

2. The scanning device as claimed in claim 1, wherein each of the two folding arms has a hollow first supporting arm, a second supporting arm and a torsion spring, the first supporting arm has a first connecting end, and a first pivoting end opposite to the first connecting end, the second supporting arm has a second connecting end, and a second pivoting end opposite to the second connecting end, the two torsion springs of the two folding arms are pivotally mounted to the first connecting ends of the first supporting arms of the two folding arms, respectively, the first connecting ends of the first supporting arms of the two folding arms together with the two torsion springs are pivotally mounted to the base and are located under the second channel, the first pivoting ends of the first supporting arms of the two folding arms are pivotally mounted to the second pivoting ends of the second supporting arms of the two folding arms, respectively, the second connecting ends of the second supporting arms of the two folding arms are pivotally mounted to the first blocking arm.

3. The scanning device as claimed in claim 2, wherein one end of the torsion spring is pivotally mounted to the first supporting arm, and the other end of the torsion spring is mounted to the base.

4. The scanning device as claimed in claim 3, wherein the base includes a first fastening portion, two opposite sides of a rear of a bottom surface of the first fastening portion protrude along a downward direction to form two blocking strips, the other ends of the two torsion springs of the two folding arms are blocked by the two blocking strips, respectively.

5. The scanning device as claimed in claim 2, wherein a middle of a top surface of the first supporting arm is recessed in a downward direction to form a locating groove, a bottom wall of the locating groove protrudes in an upward direction to form a ring-shaped pivoting ring located at the first connecting end, the downward direction is opposite to the upward direction, the torsion spring is pivotally worn around the pivoting ring.

6. The scanning device as claimed in claim 5, wherein the base includes a first fastening portion, two portions of a rear of a bottom surface of the first fastening portion protrude along the downward direction to form two protruding pillars located under the second channel and arranged along the transverse direction, the two protruding pillars are pivotally mounted in the two pivoting rings of the two first supporting arms of the two folding arms, respectively.

7. The scanning device as claimed in claim 2, wherein the first connecting ends of the first supporting arms of the two folding arms are engaged with each other, the second connecting ends of the second supporting arms of the two folding arms are engaged with each other.

8. The scanning device as claimed in claim 2, wherein several portions of two facing surfaces of the two first connecting ends of the two first supporting arms of the two folding arms protrude opposite to the two first pivoting ends of the two first supporting arms of the two folding arms to form a plurality of first teeth, the first teeth of the first supporting arm of one of the two folding arms are engaged with the first teeth of the first supporting arm of the other folding arm, several portions of two facing surfaces of the two second connecting ends of the two second supporting arms of the two folding arms protrude opposite to the two second pivoting ends of the two second supporting arms of the two folding arms to form a plurality of second teeth, the second teeth of the second supporting arm of one of the two folding arms are engaged with the second teeth of the second supporting arm of the other folding arm.

9. The scanning device as claimed in claim 2, wherein the first pivoting end defines an arc-shaped limiting groove penetrating through the first pivoting end along a downward direction, a top surface of the second pivoting end protrudes in an upward direction to form a limiting block, the limiting block is limited in the limiting groove for limiting a rotating angle of the second supporting arm with respect to the first supporting arm.

10. The scanning device as claimed in claim 1, wherein the first blocking arm has a first fastening board, and a first blocking board perpendicularly protruded in an upward direction from a rear end of the first fastening board, tail ends of the two folding arms are pivotally mounted to the first fastening board of the first blocking arm, when the two folding arms are folded to form the substantially linear shape along the longitudinal direction, the first blocking board is located to the rear end of the second channel and blocks the second channel.

11. The scanning device as claimed in claim 10, wherein a front surface of the first blocking board of the first blocking arm is parallel to the scanning read line and orthogonal to the second channel.

12. The scanning device as claimed in claim 1, wherein the base includes a main body, and a first fastening portion mounted under the main body, a front of the main body is defined as a transmitting platform, a rear of the main body is defined as a returning protrusion connected with and located behind the transmitting platform, the first fastening portion is located under the returning protrusion, and a top surface of the first fastening portion is spaced from a bottom surface of the returning protrusion to form a receiving space between the top surface of the first fastening portion and the bottom surface of the returning protrusion, a joint between the transmitting platform and the returning protrusion opens an opening communicated with the receiving space.

13. The scanning device as claimed in claim 12, wherein after the upper cover is pivotally covered to the base, the first channel is formed between a front of the bottom surface of the upper cover and a front of a top surface of the transmitting platform, the scanning channel is formed between a middle of the bottom surface of the upper cover and a middle of the top surface of the transmitting platform, a rear of the bottom surface of the upper cover cooperates with a rear of the top surface of the transmitting platform, the opening and the receiving space of the base to together form the second channel.

14. The scanning device as claimed in claim 1, wherein the card supporting mechanism includes a blocking arm which has the blocking board, and an elastic element, the blocking arm is capable of moving towards or away from the second channel to be movably located to the rear end of the second channel under an elastic action of the elastic element.

15. A scanning device capable of scanning a card, one end of the card being defined as a feeding end, and the other end of the card being defined as a scanning end, the scanning device comprising:
a base;
an upper cover pivotally covered to the base, a bottom surface of the upper cover facing and being spaced from a top surface of the base, a first channel, a scanning channel and a second channel being formed between the bottom surface of the upper cover and the top surface of the base along a longitudinal direction, the scanning channel being located between the first channel and the second channel, the scanning channel having a scanning read line, the first channel, the scanning channel and the second channel being communicated with one another;
a motor mounted to the base;
two roller assemblies connected with and driven by the motor to be able to rotate towards a forward direction or a backward direction, one of the two roller assemblies being mounted to the base and projecting into the first channel, the other roller assembly being mounted to the base and projecting into the second channel;
a sensor mounted in the first channel; and
a card supporting mechanism mounted to the base, the card supporting mechanism including a blocking board movably disposed behind the second channel along the longitudinal direction, and a front surface of the blocking board being parallel to the scanning read line and orthogonal to the second channel, wherein the card supporting mechanism is a second card supporting mechanism which includes a second blocking arm and a spring, the second blocking arm has a second fastening board, and a second blocking board perpendicularly protruded in an upward direction from a rear end of the second fastening board, a front surface of the second blocking board is parallel to the scanning read line and orthogonal to the second channel, the second blocking board is movably disposed behind the second channel along the longitudinal direction, the spring is elastically fastened between the second blocking arm and the base, the second blocking arm is capable of moving towards or away from the second channel to be movably located to a rear end of the second channel under an action of the spring which is compressed or stretched, when the spring is compressed, the second blocking board of the second blocking arm is located to the rear end of the second channel and blocks the second channel;
wherein the card is capable of moving along the first channel, the scanning channel and the second channel, a rear surface of the feeding end of the card faces the front surface of the blocking board, before the card is fed into the scanning channel to be scanned, the rear surface of the feeding end of the card abuts against the front surface of the blocking board for ensuring that a front surface of the scanning end of the card is parallel with and keeps a preset distance from the scanning read line.

16. The scanning device as claimed in claim 15, wherein the base includes a second fastening portion, two opposite sides of a bottom surface of the second fastening portion are equipped with two guiding rails, respectively, the second blocking board of the second blocking arm is capable of moving in a backward direction along the two guiding rails.

17. The scanning device as claimed in claim 15, wherein a middle of a front of a bottom surface of the second fastening board protrudes in a downward direction to form a second buckling portion, a rear of the bottom surface of the second fastening portion protrudes in the downward direction to form a first buckling portion located between the two guiding rails, one end of the spring is fastened to the first buckling portion, the other end of the spring is fastened to the second buckling portion.

18. The scanning device as claimed in claim 15, wherein the second fastening board opens a holding groove penetrating through middles of a top surface, a bottom surface and a rear surface of the second fastening board, the holding groove is located behind the second buckling portion, a substantially U-shaped reinforcing portion is connected with the bottom surface of the second fastening board, top surfaces of two opposite sides of the reinforcing portion are connected with bottom surfaces of two opposite side walls of the holding groove, the spring is elastically received in the holding groove.

* * * * *